Nov. 28, 1961     C. R. BEUTER     3,010,503

THREADED MEMBER WITH IMPALED LOCKING INSERT

Filed Jan. 29, 1958

INVENTOR
CLYDE R. BEUTER
BY

HIS ATTORNEYS

United States Patent Office 3,010,503
Patented Nov. 28, 1961

3,010,503
THREADED MEMBER WITH IMPALED LOCKING INSERT
Clyde R. Beuter, Franklin Lakes, N.J., assignor to The Nylok Corporation, Paramus, N.J., a corporation of Delaware
Filed Jan. 29, 1958, Ser. No. 711,851
4 Claims. (Cl. 151—7)

This invention relates to improvements in self-locking threaded devices and methods and apparatus for making the same and it relates particularly to self-locking male and female threaded devices such as set screws, bolts, machine screws, nuts and the like.

It has been found that many threaded devices of the type shown in the U.S. patents to Boots Nos. 2,462,603, dated February 22, 1949, and 2,539,887, dated January 30, 1951, do not have a wall thickness great enough to receive a recess which is of sufficient depth to hold securely a pellet serving as a locking element. For example, in a set screw which is provided with an axially extending socket for receiving an "Allen" wrench or the like, the wall around the socket is so thin that the recess for receiving the locking pellet cannot be drilled much deeper than the roots of the threads at the edges of the recess with the result that the periphery of the locking pellet is engaged discontinuously and is not compressed sufficiently to cause it to be retained securely in the recess. In other threaded devices, particularly those of small diameter, the depth of the recess also is restricted with a resultant difficulty in retaining the locking pellets in such devices.

In accordance with the present invention, I have found that a recess can be formed in a threaded device of the type generally described above, in such a way that the pellet is retained so securely in the recess that even when the threaded device is handled roughly, the pellet cannot be dislodged and lost.

More particularly, in accordance with the present invention, a shallow recess is drilled into the sidewall of a threaded device, such as a screw or nut in such a way that an upstanding finger or projection is formed at about the center of the recess at a zone corresponding to the crest of a thread. A locking pellet is then pressed into the recess so that the projection passes into or through the pellet thereby positioning and expanding it into tight frictional engagement with the portions of the threaded device around the recess. Even in a small screw or nut requiring a small pellet, the tight engagement of the pellet with the center projection and the peripheral portions of the recess anchors the pellet securely.

For a better understanding of the present invention, reference may be had to the accompanying drawing in which.

Figure 1:
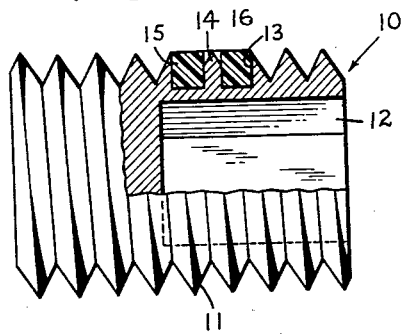
FIGURE 1 is a side elevational view and partially broken away of a typical self-locking socket head set screw of the type embodying the present invention.
Figure 2:
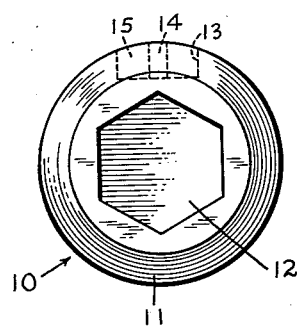
FIGURE 2 is an end elevational view of the set screw.

The invention will be described with reference to its application to a socket head set screw and a conventional form of nut although the invention is not limited to such a set screw or nut. As shown in FIGURES 1 and 2, a typical socket head set screw 10 is generally cylindrical and has a thread 11 formed on its exterior. One end of the screw is provided with a socket 12 which, as shown, is of hexagonal cross-section to receive a complementally shaped screw driver or "Allen" wrench. The wall of the set screw around the socket or recess 12 is quite thin and for that reason, a recess 13 for receiving a locking plug or pellet cannot be drilled much deeper than the roots of the threads 11 without penetrating completely through the wall. Inasmuch as the recess 13 for receiving a locking pellet is very shallow, it will be apparent that a major portion of the peripheral wall of the recess 13 is discontinuous inasmuch as it is bounded only by the sections of the thread 11. A locking pellet inserted in such a recess cannot be adequately confined and compressed sufficiently to retain it firmly in position.

In accordance with the present invention, the recess 13 is provided with a projection or finger 14 formed centrally of the recess and extending radially of the set screw, this projection or finger corresponding to the crest of a thread so that it extends from the base of the recess substantially as high as the crests of adjacent threads. Thus, when a pellet 15 of resilient material such as "nylon" (a high molecular weight linear polyamide) having a hole 16 in the center thereof of smaller diameter than the projection or finger 14 is forced into the recess 13, the pellet 15 will be impaled on the projection or finger 14 and will grip it tightly and be expanded into tight engagement with the portions of the threads around the periphery of the recess 13. It has been found in practice that the plug 15 is retained firmly in the recess 13 and that even very rough handling of the set screw will not dislodge the pellet. It is unnecessary to provide the pellet 15 with a hole 16 in many instances for the reason that the sharp end of the projection 14 will punch through the pellet. The hole 16, however, is useful in guiding the pellet accurately into the recess.

While a recess of the type disclosed in FIGURES 1 and 2 is particularly advantageous in a thin walled threaded member or in a threaded member of small diameter, it can be used equally well with larger male threaded members and enables a much shorter pellet to be used therein with consequent saving of material.

Figure 3:
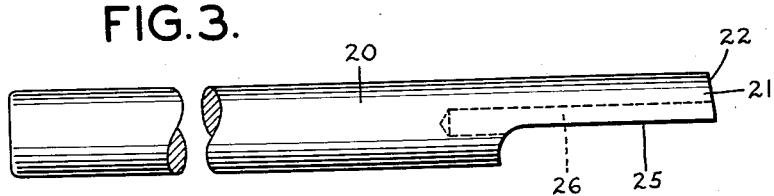
FIGURE 3 is a side elevational view of a tool for forming a socket or recess in a male threaded element.
Figure 4:
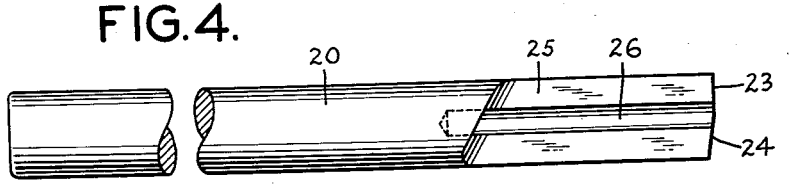
FIGURE 4 is a side elevational view of the tool shown turned 90° from the position in FIGURE 3.
Figure 5:
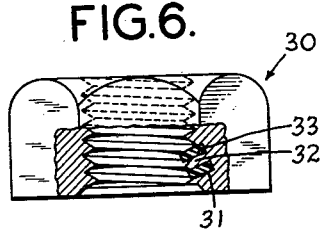
FIGURE 5 is an end elevational view of the tool looking toward the cutting end thereof.

FIGURES 3 to 5 show a tool by means of which a recess 13 and projection 14 can be formed. The tool is a form of drill having a cylindrical shank portion 20 which may be gripped in a drill chuck and rotated thereby. The shank 20 is cut away adjacent one end of the tool to leave a half round extension 21 thereon. The rounded or semi-cylindrical portion at the end of the extension 21 is ground away at an acute angle to form an inclined face 22 terminating in a cutting edge 23 disposed substantially perpendicular to the axis of the tool 20 and extending about one-half the width of the extension. A quarter segment of the extension 21 is also ground at an acute angle to the edge 23 to provide a relief face 24 so that only the edge 23 can engage and cut away the metal. Also, extending substantially lengthwise of the diametrical flat face 25 of the extension 21 is a semi-cylindrical groove 26 which is formed by drilling a hole axially of the shank before it is cut away to form the flat face 25 on the extension 21. If desired, the groove can extend only part of the length of the extension 21.

When the tool is brought against a workpiece such as the set screw 10, the cutting edge 23 cuts away the metal to form the annular recess 13 in the workpiece and leaves the cylindrical center projection 14 extending along the groove 26.

By providing tools of the type described in varying diameters and having grooves 26 of varying diameters therein, it is possible to form shallow or deep annular recesses with upstanding projections at their centers in almost any kind of male threaded element.

Figure 6:
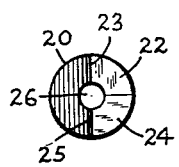
FIGURE 6 is a side elevational view of a nut embodying the present invention with a portion of the nut broken away to disclose details thereof.

Also, as shown in FIGURE 6, nuts of various types, such as the hexagonal nut 30, can be drilled to provide a recess 31 therein having an axial projection 32 on which a locking pellet 33 is impaled. A drill of the type described above is inserted at an angle through one end of the nut to drill the inclined recess 31 in the nut and the pellet 33 is then pressed into the recess. A solid pellet or a pellet having an axial opening therein can be used, as desired. In either event the pellet is expanded into tight engagement with the wall of the recess 31 and also grips the projection 32 tightly thereby preventing the pellet from being dislodged from the nut.

Inasmuch as the invention may be embodied in many different types of self-locking threaded devices and the drills may be constructed to form annular recesses of widely varying size in many different kinds of threaded devices, the forms of the invention described herein should be considered as illustrative.

I claim:

1. A self-locking threaded device comprising a member having threads thereon, a recess of circular cross-section in one side only of said member and intersecting a plurality of said threads, said recess having a cylindrical side wall and a closed bottom disposed at least partially behind the roots of said threads, a substantially cylindrical projection integral with the bottom of the recess and extending substantially axially of said recess from about the center of the bottom of said recess, said projection having a free end terminating at about the crest line of a thread intersected by said recess, said free end having a configuration corresponding to the crest portion of the thread on said member and a pellet of resilient material in said recess and impaled on said projection in tight frictional engagement therewith, said pellet extending a substantial distance beyond the root of said thread towards the crest of said thread.

2. The self-locking device as set forth in claim 1 in which said member is a set screw having a tool receiving socket extending from one end thereof inwardly beyond said recess, said bottom of said recess being disposed outwardly of said socket.

3. The self-locking device set forth in claim 1 in which said pellet has an external diameter at least as great as the diameter of said recess.

4. The self-locking device set forth in claim 1 in which said member is a nut and said recess has an axis inclined to the axis of the nut.

References Cited in the file of this patent

UNITED STATES PATENTS

| | | |
|---|---|---|
| 1,051,508 | Miller | Jan. 28, 1913 |
| 2,399,107 | Eckenbeck et al. | Apr. 23, 1946 |
| 2,481,762 | Lewis | Sept. 13, 1949 |
| 2,520,121 | Brutus | Aug. 29, 1950 |
| 2,520,122 | Brutus | Aug. 29, 1950 |
| 2,539,887 | Boots | Jan. 30, 1951 |
| 2,561,185 | Drake | July 17, 1951 |
| 2,663,344 | Burdick | Dec. 22, 1953 |
| 2,672,173 | Chantler | Mar. 16, 1954 |
| 2,780,947 | Willingham | Feb. 12, 1957 |

FOREIGN PATENTS

| | | |
|---|---|---|
| 662,298 | Great Britain | Dec. 5, 1951 |